(No Model.) 2 Sheets—Sheet 1.

L. J. LEMAIRE.
REGENERATIVE GAS FURNACE.

No. 569,421. Patented Oct. 13, 1896.

WITNESSES:
C. E. Tomlinson
L. F. Weisburg

INVENTOR,
Louis J. Lemaire,
BY Alfred Wilkinson
his ATTORNEY.

UNITED STATES PATENT OFFICE.

LOUIS J. LEMAIRE, OF ALEXANDRIA, INDIANA.

REGENERATIVE GAS-FURNACE.

SPECIFICATION forming part of Letters Patent No. 569,421, dated October 13, 1896.

Application filed September 26, 1895. Serial No. 563,698. (No model.)

*To all whom it may concern:*

Be it known that I, LOUIS J. LEMAIRE, a citizen of Belgium, residing at Alexandria, in the county of Madison and State of Indiana, have invented a new and useful Regenerative Gas-Furnace; and I do hereby declare that the following, in connection with the accompanying drawings, is a full, clear, and exact description of the invention.

My invention relates to a continuous regenerative heating-furnace for high temperatures for the melting and manufacturing of glass, steel, &c. The combustion chamber or hearth is of usual construction, and my improvement consists in the additional regenerative chambers through which the current of air passes in and through which the air mixed with the products of combustion passes out. By my construction the furnace is made much more durable, wear and damage to the checker-work is reduced, and where it is necessary to make repairs this may be done much more easily and conveniently and without shutting down and cooling off the whole furnace.

I construct my improved furnace, as here shown, with two air-regenerative chambers on each side provided with proper flues for the inflow of air and the outflow of the products of combustion. These four chambers are built up with checkerwork or open brickwork in the usual way, and in connection with each I provide what I call an "intermediate" or "deposition" chamber. These are strongly built without checkerwork and receive in the first place the highly-heated draft passing out from the hearth, which is cooled in them to some extent, and also deposits in them the chemical products of combustion and dust, which act injuriously on the more delicate checkerwork. When the furnace is in operation, the air may be controlled so as to flow in and the products of combustion so as to flow out through both regenerative chambers and the corresponding deposition-chambers on each side, or through one of each on each side, or through both regenerative chambers and both deposition-chambers on one side, and a single one of each on the other, as may be desired for controlling the draft and the heat or for the purpose of making repairs.

My invention will be better understood by reference to the accompanying drawings, in which the same letters and numerals refer to the same parts in all the views.

Figure 1:
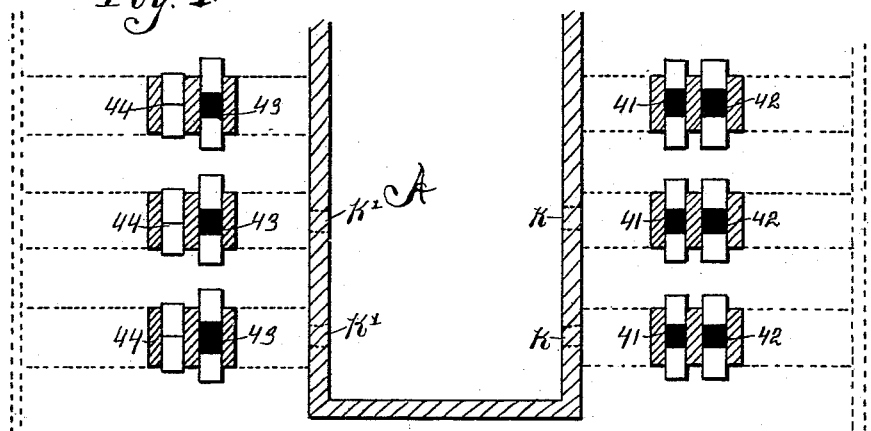
Figure 2:
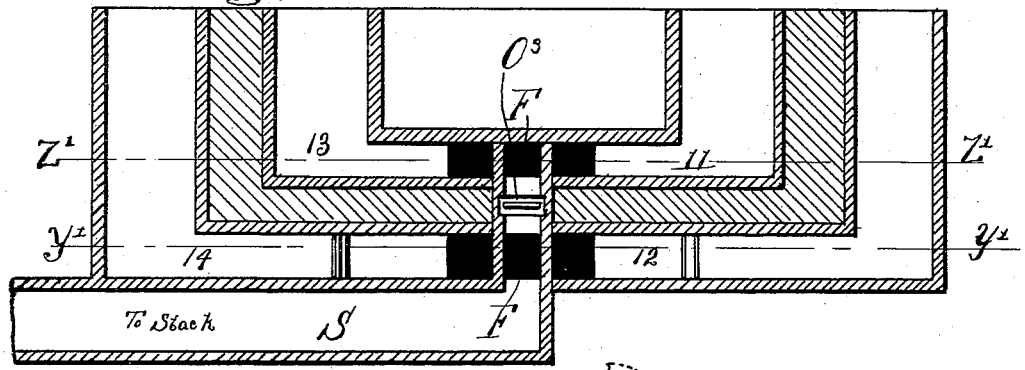
Figure 6:
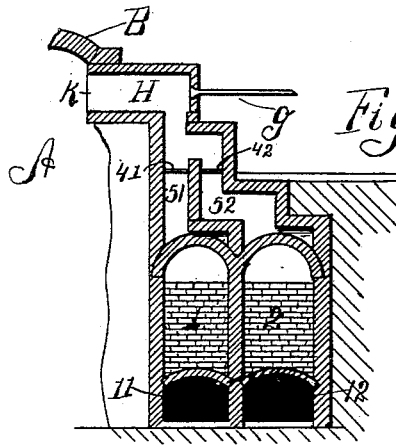
Figure 7:
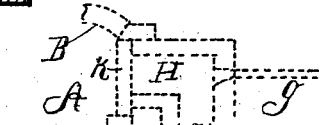
Figure 3:
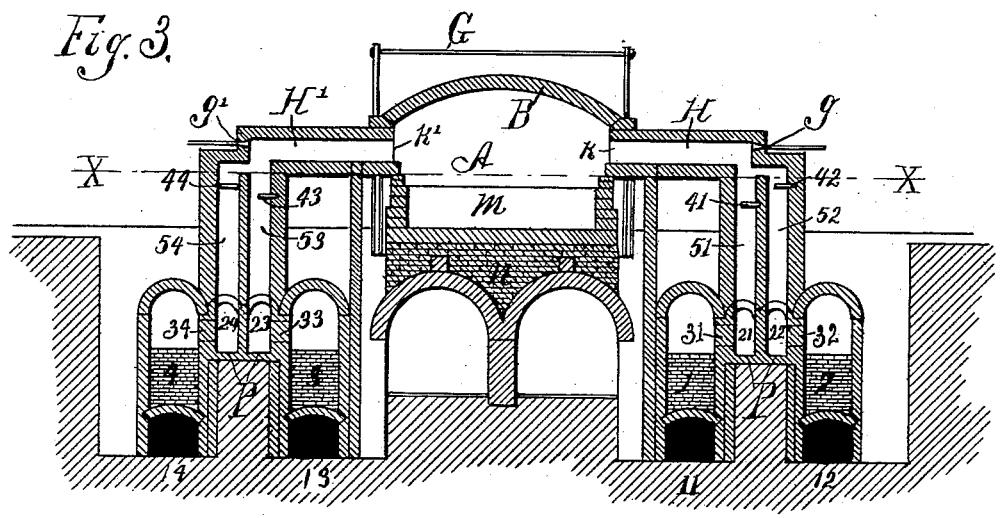
Figure 4:
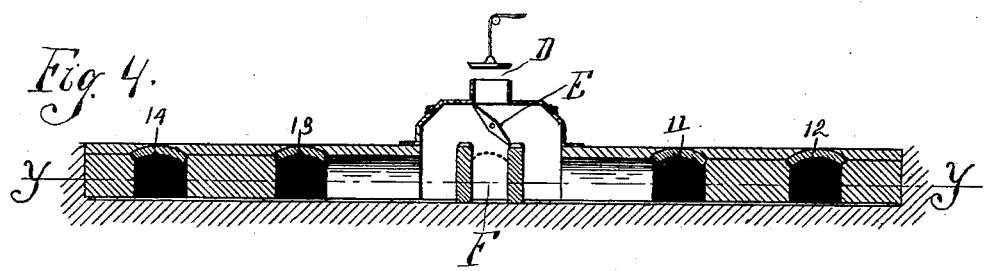
Figure 5:
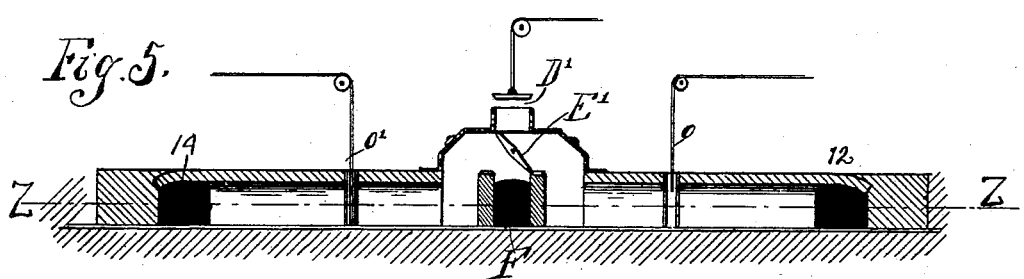

Figure 1 is a horizontal section of the hearth and flues on each side, taken on line X X of Fig. 3. Fig. 2 is a horizontal section of flues in front of lower portion of Fig. 3, taken on line Y Y of Fig. 4 and line Z Z of Fig. 5. Fig. 3 is a vertical cross-section of furnace and flues. Fig. 4 is a vertical section on line Z' Z' of Fig. 2. Fig. 5 is a vertical section on line Y' Y' of Fig. 2. Fig. 6 is a vertical section of a construction of furnace in which deposition-chambers are omitted. Fig. 7 is a vertical section of a construction of furnace in which a deposition-chamber is used in connection with a single regenerative chamber.

A indicates the hearth or main combustion-chamber in which the material, such as glass or steel, is melted, the surface of the molten material being indicated by line M.

N indicates the supporting arches or foundation.

B is the arched top of brickwork, and G the iron braces on the exterior.

1, 2, 3, and 4 are the air-regenerative chambers into which the air is admitted and from which the products of combustion pass out through the respective flues 11, 12, 13, and 14.

31, 32, 33, and 34 are the ports opening from the respective regenerative chambers 1, 2, 3, and 4 into their corresponding deposition-chambers 21, 22, 23, and 24. From these the air passes into the respective flues 51, 52, 53, and 54, provided with valves 41, 42, 43, and 44, which may be opened or closed, permitting the air to pass or not, as may be desired, from the particular regenerative chambers into the main flues H H' or from the main flues H H' into the particular deposition and regenerative chambers. In the main flues H and H' the air mingles with the natural gas admitted through nozzles $g$ or $g'$, thence passing into the combustion-chamber by ports K and K'. The air is admitted into the flues 11, 12, 13, and 14, through the valves D and D', and is thrown in the desired direction by means of the reversible valves or "butterflies" E and E'. These butterflies are reversed at short intervals, throwing the air first in one direction and then in the other.

To use chambers 1, 3, 21, and 23, the valve D must be open. When it is closed, they are out of use; and in a similar way to use chambers 2, 4, 22, and 24, D' must be open, the butterflies E and E' being thrown first in one direction and then in the other. The outer flues 11, 12, 13, and 14 are also provided, where desired, with valves or dampers O O' for controlling the outflow of products of combustion and cutting off said flues from flue F, leading to stack, where desired to make repairs or for other reasons. Damper O³ is provided in flue F, by which flues 11 and 13 may be cut off simultaneously from flue F.

The operation of my improved furnace, as here shown, is as follows: The two valves D and D' are open, the air passing in through both and being turned through flues 11 and 12 (the valve O being also open) into the regenerative chambers 1 and 2, from which it passes by ports 31 and 32 into the deposition-chambers 21 and 22, and thence by the flues 51 and 52, the valves 41 and 42 being open, into the main flue H, where it mixes with the natural gas introduced through nozzle $g$, passing thence through ports K into the combustion-chamber A, whence, combustion having taken place, the residue of air, mixed with dust and other products of combustion, passes out through ports K' into the main flues H'. On this side of the furnace the valve 44 is shown closed, but the valve 43 open, so that the draft cannot pass into the flue 54 and chambers 24 and 4; but the whole draft passes through the open valve 43 and flue 53 into deposition-chamber 23, where most of the products of combustion are deposited and the draft is somewhat cooled, whereby the checkerwork is preserved from contact with the injurious products of combustion and the intense heat. This deposition is facilitated by the fact that the floors P of all the deposition-chambers are a little lower than the bottom of the ports of communication between them and the regenerating-chambers. The air then passes from deposition-chamber 23 by port 33 into regenerative chamber 3, and out through the flue 13 and flue F to the stack S, damper O' being shut. The openings 31 32 33 34 in respective deposition-chambers 21 22 23 24 are arranged alternating with and not opposite to the mouths of flues 51 52 53 54, opening, respectively, into said deposition-chambers. This is indicated in Figs. 3 and 7. By this construction the outflowing products of combustion traverse a longer course in passing through the deposition-chambers, by which deposition in said chambers of dust and products of combustion is promoted, as well as the cooling of the outdraft.

I have observed that by dividing the outflowing air between the two regenerative chambers, even without the use of the intermediate deposition-chambers, the amount of heat applied to each regenerative chamber is decreased, and the wear and disintegration of the checkerwork therein is greatly retarded, and when it is necessary to make repairs in either chamber the whole draft may be turned through the other, and it is not necessary to shut down the furnace.

In Fig. 6 I have shown the manner in which the double regenerative chambers may be arranged when the intermediate deposition-chambers are omitted. 1 and 2 are the regenerative chambers, 11 and 12 their respective flues through which the air is introduced. 51 and 52 are the flues provided with valves 41 and 42, leading to the main flue H. This construction is sometimes desirable, as well as the construction shown in Fig. 7, on account of economy in building smaller furnaces or for other reasons; but I always prefer to build a furnace with the double regenerative chambers and the corresponding intermediate deposition-chambers.

In Fig. 7 is shown a construction in which only one regenerative chamber is used on each side in connection with a deposition-chamber between it and the hearth. In this view 1 indicates the air-regenerative chamber, 11 the flue leading thereto, 21 the intermediate deposition-chamber, with which communication is had by the port 31, (here shown in full lines,) while the flue 51 and the main flue H, leading to the port K, are shown in dotted lines to indicate that the port 31 is not opposite the mouth of flue 51, opening into chamber 21 for reasons before given.

I have illustrated an improved furnace, in which natural gas is used for fuel; but it is evident that artificial gas may be used with the same results, as far as my improved construction is concerned.

Having thus fully described my invention, what I claim, and desire to protect by Letters Patent, is—

1. In a reverberatory furnace in combination with the hearth, of air-regenerating chambers, two on each side thereof, corresponding deposition-chambers two on each side of the hearth arranged to receive the draft on its passage from the hearth to the regenerative chambers or vice versa, ports connecting each regenerative chamber with its corresponding deposition-chamber, and flues provided with valves connecting the deposition-chambers with the hearth, substantially as described and shown.

2. In a reverberatory furnace in combination with the hearth, of air-regenerating chambers two on each side thereof, corresponding deposition-chambers two on each side of the hearth arranged to receive the draft on its passage from the hearth to the regenerative chambers or vice versa, ports connecting each regenerative chamber with its corresponding deposition-chamber, flues provided with valves connecting the deposition-chambers with the main flues communicating with the hearth by ports, and means for introducing combustible gas into said main flues, substantially as described and shown.

3. In a reverberatory furnace, means for introducing heated air into the hearth, consisting of double air-regenerating chambers on each side of the hearth, flues for admitting air into said regenerative chambers, flues connecting said regenerative chambers with the hearth, and valves in said flues for controlling the outflow through one or both of said double chambers at will, substantially as described and shown.

4. In combination with the hearth A of a reverberatory furnace, means for heating and introducing the air therein mixed with gas, consisting of valves D D', butterflies E E', flues 11, 12, 13, and 14, air-regenerating chambers 1, 2, 3, and 4, ports 31, 32, 33, and 34, deposition-chambers 21, 22, 23, and 24, flues 51, 52, 53, and 54, provided with valves 41, 42, 43, and 44, and main flues H H', communicating with hearth A by ports K K', substantially as described and shown.

In witness whereof I have hereunto set my hand, in the presence of two attesting witnesses, at Alexandria, in the county of Madison, in the State of Indiana, this 5th day of July, 1895.

LOUIS J. LEMAIRE.

Witnesses:
 JESSE E. HALL,
 J. W. VERMILLION.